(12) United States Patent
Biesboer et al.

(10) Patent No.: US 10,703,025 B1
(45) Date of Patent: Jul. 7, 2020

(54) METHODS AND FORMULATIONS FOR JOINING PRECERAMIC POLYMERS IN THE FABRICATION OF CERAMIC ASSEMBLIES

(71) Applicant: HRL Laboratories, LLC, Malibu, CA (US)

(72) Inventors: Scott M. Biesboer, Santa Monica, CA (US); Tobias A. Schaedler, Oak Park, CA (US); Jacob M. Hundley, Newbury Park, CA (US); Zak C. Eckel, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 182 days.

(21) Appl. No.: 15/840,146

(22) Filed: Dec. 13, 2017

Related U.S. Application Data

(60) Provisional application No. 62/438,801, filed on Dec. 23, 2016.

(51) Int. Cl.
  *B29C 39/00* (2006.01)
  *C04B 35/56* (2006.01)
  (Continued)

(52) U.S. Cl.
  CPC ............ *B29C 39/003* (2013.01); *B28B 1/001* (2013.01); *B28B 1/14* (2013.01); *B29C 39/38* (2013.01);
  (Continued)

(58) Field of Classification Search
  CPC ..... B29C 39/003; B29C 64/106; B29C 64/30; B29C 39/38; B29C 65/02; B29C 65/56;
  (Continued)

(56) References Cited

U.S. PATENT DOCUMENTS

| 3,695,877 A | 10/1972 | Taneda et al. |
| 3,790,378 A | 2/1974 | Hayakawa et al. |

(Continued)

FOREIGN PATENT DOCUMENTS

WO    2016044547 A1    3/2016

OTHER PUBLICATIONS

Eckel et al., "Additive manufacturing of polymer-derived ceramics" Science, vol. 35, Issue 6268, pp. 58-62 + Supplementary Materials, Jan. 1, 2016.

(Continued)

*Primary Examiner* — Vishal I Patel
(74) *Attorney, Agent, or Firm* — O'Connor & Company

(57) ABSTRACT

Some variations provide a process for fabricating a ceramic structure, the process comprising: producing a plurality of preceramic polymer parts; chemically, physically, and/or thermally joining the preceramic polymer parts together, to generate a preceramic polymer structure; thermally treating the preceramic polymer structure, to generate a ceramic structure; and recovering the ceramic structure. The process may employ additive manufacturing, subtractive manufacturing, casting, or a combination thereof. A composite overwrap may be applied to the preceramic polymer structure prior to pyrolysis, and the composite overwrap also pyrolyzes to a ceramic composite and is a part of the final ceramic structure. The ceramic structure may be silicon oxycarbide, silicon carbide, silicon nitride, silicon oxynitride, silicon carbonitride, silicon boronitride, silicon boron carbonitride, or boron nitride, for example. The ceramic structure may have at least one dimension of 1 meter or greater, and may be a fully integrated ceramic object with no seams.

30 Claims, 4 Drawing Sheets

(51) Int. Cl.
  *B29C 64/106* (2017.01)
  *B29C 39/38* (2006.01)
  *B29C 64/30* (2017.01)
  *B29C 65/56* (2006.01)
  *B29C 65/02* (2006.01)
  *B28B 1/00* (2006.01)
  *B28B 1/14* (2006.01)
  *B33Y 10/00* (2015.01)
  *B33Y 70/00* (2020.01)
  *C04B 35/64* (2006.01)
  *B29L 31/00* (2006.01)
  *B29K 83/00* (2006.01)
  *B29K 85/00* (2006.01)
  *B29K 105/16* (2006.01)

(52) U.S. Cl.
  CPC ............ *B29C 64/106* (2017.08); *B29C 64/30* (2017.08); *B29C 65/02* (2013.01); *B29C 65/56* (2013.01); *B33Y 10/00* (2014.12); *B33Y 70/00* (2014.12); *C04B 35/5603* (2013.01); *C04B 35/64* (2013.01); *B29K 2083/00* (2013.01); *B29K 2085/00* (2013.01); *B29K 2105/16* (2013.01); *B29L 2031/7532* (2013.01); *C04B 2235/602* (2013.01)

(58) Field of Classification Search
  CPC ......... B29C 64/10; B33Y 10/00; B33Y 70/00; B28B 1/001; B28B 1/14; C04B 35/5603; C04B 35/64; C04B 2235/6026
  See application file for complete search history.

(56) References Cited

U.S. PATENT DOCUMENTS

| | | | |
|---|---|---|---|
| 7,183,335 | B2 | 2/2007 | Napadensky |
| 7,964,248 | B2 | 6/2011 | Fong et al. |
| 8,906,593 | B1 | 12/2014 | Nowak et al. |
| 2003/0102071 | A1* | 6/2003 | Mako ..................... B82Y 30/00 156/89.11 |
| 2006/0069176 | A1 | 3/2006 | Bowman et al. |
| 2006/0208388 | A1 | 9/2006 | Bredt et al. |
| 2008/0194721 | A1 | 8/2008 | Arney et al. |
| 2009/0148813 | A1 | 6/2009 | Sun et al. |
| 2010/0269721 | A1 | 10/2010 | Takahashi et al. |
| 2010/0279007 | A1 | 11/2010 | Briselden et al. |
| 2014/0131908 | A1 | 5/2014 | Sun et al. |
| 2016/0128909 | A1 | 5/2016 | Fontein et al. |
| 2016/0236987 | A1* | 8/2016 | Berczik ................. C08G 77/60 |
| 2016/0244625 | A1 | 8/2016 | Clapp et al. |
| 2016/0332382 | A1 | 11/2016 | Coward et al. |
| 2017/0204227 | A1 | 7/2017 | Eckel |

OTHER PUBLICATIONS

Colombo et al., "Multifunctional advanced ceramics from preceramic polymers and nano-sized active fillers" Journal of the European Ceramic Society 33 (2013) 453-469.

Duan et al., "A review of absorption properties in silicon-based polymer derived ceramics" Journal of the European Ceramic Society 36 (2016) 3681-3689.

Colombo et al., "Joining of reaction-bonded silicon carbide using a preceramic polymer" Journal of Materials Science 33 (1998) 2405-2412.

Colombo et al., "Joining SiC-Based Ceramics and Composites With Preceramic Polymers" Ceramic Transactions(USA) 144 (2002): 323-334.

Liu et al., "Joining of Cf/SiC Ceramic Matrix Composite Using SiC-Si3N4Preceramic Polymer", Materials Science Forum, vols. 475-479, 2005, abstract.

Bernardo et al., "SiAlON ceramics from preceramic polymers and nano-sized fillers: Application in ceramic joining" Journal of the European Ceramic Society vol. 32, Issue 7, Jun. 2012, abstract.

* cited by examiner

METHODS AND FORMULATIONS FOR JOINING PRECERAMIC POLYMERS IN THE FABRICATION OF CERAMIC ASSEMBLIES

PRIORITY DATA

This patent application is a non-provisional application with priority to U.S. Provisional Patent App. No. 62/438,801, filed Dec. 23, 2016, which is hereby incorporated by reference herein.

FIELD OF THE INVENTION

The present invention generally relates to methods of joining preceramic polymers for making ceramic composites and structures.

BACKGROUND OF THE INVENTION

There is high commercial demand for additively manufactured (3D-printed) ceramics in fields including industrial filtration (molten metal filters, flow separators); metal processing (casting molds/blanks); implantable dental and medical devices; and semiconductor processing. Additive manufacturing of ceramic materials is also of interest for propulsion components, thermal protection systems, porous burners, microelectromechanical systems, and electronic device packaging, for example.

In comparison with metals and polymers, ceramics are difficult to process, particularly into complex shapes. Because they cannot be cast or machined easily, ceramics are typically consolidated from powders by sintering or deposited in thin films. Flaws, such as porosity and inhomogeneity introduced during processing, govern the strength because the flaws initiate cracks, and brittle ceramics have little ability to resist fracture. This processing challenge has limited the ability to take advantage of ceramics' impressive properties, including high-temperature capability, environmental resistance, and high strength.

Ceramic matrix composite (CMC) materials overcome many disadvantages of conventional ceramics, such as brittle failure, low fracture toughness, and limited thermal shock resistance. Applications of ceramic matrix composites include those requiring reliability at high temperatures (beyond the capability of metals or polymers) and resistance to corrosion and wear.

No mature method for 3D printing ceramic matrix composites exists. Currently, CMC materials are limited to manual lay-up, molding, or thermoforming. There are also known techniques for sintering ceramic particles or using ceramic particles printed in a binder, both of which typically produce porous ceramics which have lower strength than the parent material. Ceramic structures are often sintered as compacted porous materials, severely limiting the manufacturable geometries.

Preceramic polymers are a class of polymers which allow, via a thermal treatment, a conversion of a polymer part to a ceramic material. Typically, these preceramic polymers contain silicon (Si) in the molecular backbone, with the resulting material containing Si. There are a wide variety of known preceramic polymers. Examples include polysilazanes, borazine-modified hydridopolysilazanes, polysilanes, polycarbosilanes, silicone resins, polyvinylborazine, polyborazylene, and decaborane-based polymers. These preceramic polymers have been used to form specific polymer-based structures that can be subsequently heat-treated (pyrolyzed or sintered) to create near net-shape ceramic structures.

Formulations have been described for creating ceramic materials, which can be printed (additively manufactured) with various methods such as stereolithography techniques and laser sintering. These are typically unreinforced ceramics and suffer from low fracture toughness. These methods are described in Zocca et al., "Additive Manufacturing of Ceramics: Issues, Potentialities, and Opportunities", J. Am. Ceram. Soc., 98 [7] 1983-2001 (2015). In addition, formulations which can create 1D or 2D ceramics, or very small 3D structures, have been described. See U.S. Pat. No. 4,816,497 issued Mar. 28, 1989 to Lutz et al.; U.S. Pat. No. 5,698,485 issued Dec. 16, 1997 to Bruck et al.; U.S. Pat. No. 6,573,020 issued Jun. 3, 2003 to Hanemann et al.; U.S. Pat. No. 7,582,685 issued Sep. 1, 2009 to Arney et al.; and U.S. Patent App. Pub. No. US2006/0069176A1 published Mar. 30, 2006 to Bowman et al.

When a large, detailed ceramic object is desired, traditionally such ceramics have been machined from a fired or prefired (green) body to the final desired shape. Direct 3D printing of ceramics can reduce significantly the manufacturing costs of ceramic components. However, there are limitations on the sizes of parts that can be fabricated, based on 3D printing of preceramic polymers into a single part followed by pyrolysis of that part. Also, geometry errors can arise for complicated part geometries. Because of these challenges, parts of the preceramic type have typically been molded to shape rather than additively manufactured. Others have employed preceramic resins to join ceramic parts (i.e. parts which have already been pyrolyzed).

In view of the shortcomings in the art, methods and formulations to fabricate large ceramic objects with arbitrary geometries are still needed.

SUMMARY OF THE INVENTION

The present invention addresses the aforementioned needs in the art, as will now be summarized and then further described in detail below.

Some variations provide a method of fabricating a ceramic structure, the method comprising:
(a) selecting an overall ceramic structure geometry;
(b) selecting a plurality of ceramic sub-structure geometries as geometric components of the overall ceramic structure geometry;
(c) making a plurality of preceramic polymer parts that have the ceramic sub-structure geometries selected in step (b);
(d) chemically, physically, and/or thermally joining the preceramic polymer parts together, to generate a preceramic polymer structure; and
(e) thermally treating the preceramic polymer structure, to generate a ceramic structure that has the overall ceramic structure geometry selected in step (a).

In some embodiments, the preceramic polymer parts are made by polymerizing a polymerizable (e.g., photopolymerizable) preceramic resin, such as a resin selected from the group consisting of siloxanes, carbosilanes, silanes, silazanes, silsesquioxanes, borazines, phenolics, and combinations thereof.

The preceramic polymer parts may include a preceramic polymer selected from the group consisting of polycarbosilane, polysilane, polysilazane, polysiloxane, polyborazine, and combinations thereof. In some embodiments, the preceramic polymer parts include a particulate filler.

Step (c) may employ additive manufacturing, subtractive manufacturing, casting, or a combination thereof. In various embodiments, step (c) employs an additive manufacturing technique selected from the group consisting of stereolithography, binder jetting, polyjetting, extrusion printing, and combinations thereof.

Step (d) may utilize a curable monomer resin to bond at least some of the preceramic polymer parts together. The curable monomer resin may be selected from the group consisting of siloxanes, carbosilanes, silanes, silazanes, silsesquioxanes, borazines, phenolics, and combinations thereof.

Alternatively, or additionally, during step (d), at least some of the preceramic polymer parts may be held together by mechanical means. The mechanical means may be designed into at least some of the preceramic polymer parts.

Alternatively, or additionally, during step (d), at least some of the preceramic polymer parts may be held together with a core or mold. The core or mold may be designed such that it melts out and/or vaporizes during step (e).

Step (d) may also utilize thermal bonding of at least some of the preceramic polymer parts using at a temperature of about 350° C. or less.

In some embodiments, the method further comprises disposing a composite overwrap onto the preceramic polymer structure. The composite overwrap may include a material selected from the group consisting of carbon fibers, glass fibers, silicon carbide, Si—C—O fibers, silicon nitride, alumina fibers, polymer fibers, and combinations thereof.

The composite overwrap (when used) may be infiltrated with a material selected from the group consisting of siloxanes, carbosilanes, silanes, silazanes, silsesquioxanes, borazines, phenolics, and combinations thereof.

The composite overwrap (when used) may be employed as a scaffold to contain multiple the preceramic polymer parts when joining the preceramic polymer parts together and/or to bond the composite overwrap to the preceramic polymer structure.

In certain embodiments, the method further comprises disposing a composite overwrap onto an intermediate ceramic structure generated by thermally treating the preceramic polymer structure, followed by thermally treating the composite overwrap disposed on the intermediate ceramic structure, to generate the final ceramic structure.

The final ceramic structure may include a ceramic material selected from the group consisting of silicon oxycarbide, silicon carbide, silicon nitride, silicon oxynitride, silicon carbonitride, silicon boronitride, silicon boron carbonitride, boron nitride, and combinations thereof, for example.

The plurality of preceramic polymer parts may be at least 3 preceramic polymer parts or at least 10 preceramic polymer parts, for example. The final ceramic structure may be a fully integrated ceramic object with no seams, made by uniting multiple objects resulting in a fully dense ceramic object as if it was created in one single part before joining. The final ceramic structure may have at least one dimension of about 1 centimeter or greater, or about 1 meter or greater.

Some variations of the invention provide a process for fabricating a ceramic structure, the process comprising:
(a) producing a plurality of preceramic polymer parts;
(b) chemically, physically, and/or thermally joining the preceramic polymer parts together, to generate a preceramic polymer structure;
(c) thermally treating the preceramic polymer structure, to generate a ceramic structure; and
(d) recovering the ceramic structure.

Step (a) may employ additive manufacturing, subtractive manufacturing, casting, or a combination thereof. In some embodiments, the process further comprises disposing a composite overwrap onto the preceramic polymer structure.

The ceramic structure may include a ceramic material selected from the group consisting of silicon oxycarbide, silicon carbide, silicon nitride, silicon oxynitride, silicon carbonitride, silicon boronitride, silicon boron carbonitride, boron nitride, and combinations thereof.

In some embodiments, the ceramic structure has at least one dimension of about 1 meter or greater, and is a fully integrated ceramic object with no seams.

The present invention also provides a ceramic structure produced by a process comprising:
(a) producing a plurality of preceramic polymer parts;
(b) chemically, physically, and/or thermally joining the preceramic polymer parts together, to generate a preceramic polymer structure;
(c) thermally treating the preceramic polymer structure, to generate a ceramic structure; and
(d) recovering the ceramic structure,
wherein the ceramic structure has at least one dimension of about 1 meter or greater, and
wherein the ceramic structure is a fully integrated ceramic object with no seams.

Some alternative variations of the invention provide a process for fabricating a ceramic structure, the process comprising:
(a) producing a plurality of preceramic polymer parts;
(b) thermally treating each of the plurality of preceramic polymer parts, to generate a plurality of ceramic parts;
(c) joining the plurality of ceramic parts by disposing a preceramic composite overwrap scaffold onto the plurality of ceramic parts, to generate an intermediate structure;
(d) thermally treating the intermediate structure, to generate a ceramic structure; and
(e) recovering the ceramic structure.

Optionally, step (c) further includes chemically, physically, and/or thermally joining the plurality of ceramic parts together, either prior to adding the preceramic composite overwrap scaffold, or after adding the scaffold.

The preceramic composite overwrap scaffold may include a material selected from the group consisting of carbon fibers, glass fibers, silicon carbide, Si—C—O fibers, silicon nitride, alumina fibers, polymer fibers, and combinations thereof. The preceramic composite overwrap scaffold may be infiltrated with a material selected from the group consisting of siloxanes, carbosilanes, silanes, silazanes, silsesquioxanes, borazines, phenolics, and combinations thereof.

The present invention also provides a ceramic structure produced by a process comprising:
(a) producing a plurality of preceramic polymer parts;
(b) thermally treating each of the plurality of preceramic polymer parts, to generate a plurality of ceramic parts;
(c) joining the plurality of ceramic parts by disposing a preceramic composite overwrap scaffold onto the plurality of ceramic parts, to generate an intermediate structure;
(d) thermally treating the intermediate structure, to generate a ceramic structure; and
(e) recovering the ceramic structure.

DETAILED DESCRIPTION OF EMBODIMENTS OF THE INVENTION

Figure 1:
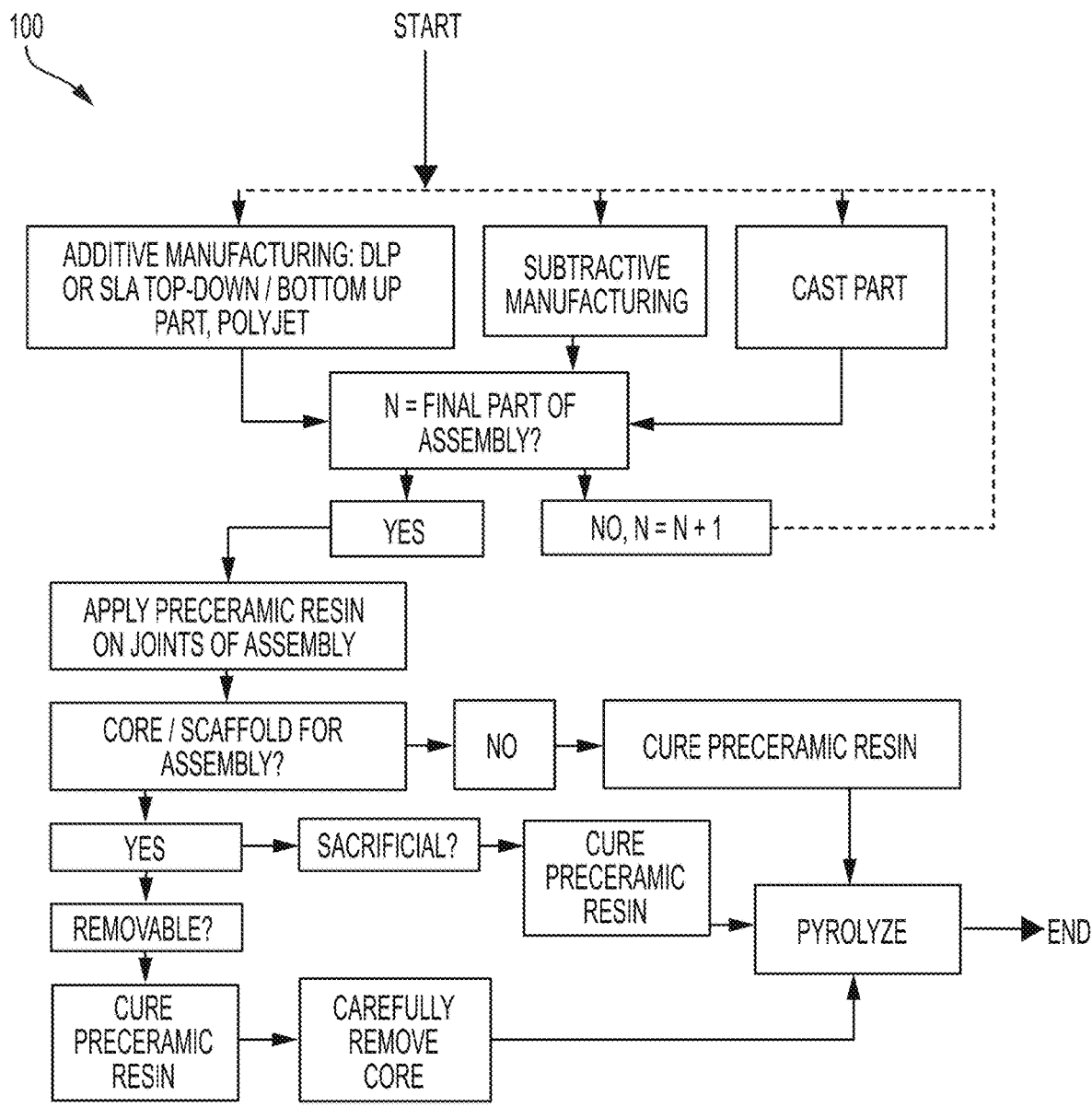
FIG. 1 is an exemplary method flowchart according to some non-limiting embodiments of the invention.

The compositions (also referred to as formulations), structures, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

Some variations of the invention are premised on methods for joining two or more additively manufactured preceramic polymer parts prior to pyrolysis to form an intermediate structure, which is then pyrolyzed to yield a ceramic assembly. By employing photopolymerizable preceramic resin for the preceramic polymer parts, a chemical bond between parts forms when the parts (or regions thereof) are photopolymerized or heat-cured. Note that a "joint" as used herein mean an interface or region at which two or more parts come into contact with each other.

This method allows multiple, smaller portions of a desired larger part to be additively manufactured and then bonded together, thereby creating a larger preceramic polymer assembly that can then be pyrolyzed into a ceramic assembly. The ceramic assembly may be significantly larger than achievable with a single stereolithography printer bed or other techniques.

In some embodiments, composite overwraps (containing preceramic resin) are placed on cured preceramic polymer parts, to bond a surface of the preceramic polymer to the composite overwrap, bond preceramic polymer parts together, or a combination thereof. The composite overwrap may be soaked in a preceramic resin that is the same resin formulation used for the additively manufactured preceramic polymer, and/or in a different resin formulation. The composite overwrap enhances bonding characteristics by holding the preceramic polymer pieces together and provides strength to the bonded part during and after pyrolysis.

The bonding resin and/or composite overwrap resin are integrated chemically into the bonded structure, and then converted to a ceramic assembly through pyrolysis or other thermal treatment. This method produces a final ceramic assembly that can be (in preferred embodiments) a single ceramic part with no bond lines and seams.

The disclosed bonding methods to join additively manufactured preceramic polymer parts, and optional incorporation of composite overwraps, enables internal features (such as heating or cooling channels) to be practically implemented into large ceramic assemblies. Traditional machining methods cannot be used to fabricate certain internal features.

The extremely high melting point of many ceramics poses a challenge to additive manufacturing to make a 3D part, as compared with metals and polymers. Ceramics cannot be cast or machined easily. By contrast, the present methods enable significant geometrical flexibility for a range of ceramic parts and ceramic objects.

The invention disclosed herein applies to additively manufactured components (to reduce part count, scrap, non-recurring engineering, etc.), and high-wear or high-temperature applications that would necessitate ceramic materials. Specific applications include propulsion structures (e.g., vanes, impellors, nacelles, or thrusters), control surfaces (e.g., fins or leading edges), hypersonic structures (e.g., thermal protection systems or heat shields), high-wear components (e.g., brakes, clutches, or rotors), catalyst support structures, pump components, filters, brakes, and clutches.

In addition, there is high commercial demand for additively manufactured ceramics in fields including industrial filtration (e.g., molten metal filters or flow separators), metal processing (e.g., casting molds/blanks), implantable dental and medical devices, and semiconductor processing.

Many of these applications require large components with high-temperature materials. Commercially available 3D-printing techniques such as stereolithography are limited in the size (area and height) of parts which can be produced in a single operation. Therefore, for such applications listed above, it is advantageous to produce a plurality of polymer parts capable of being additively manufactured and then join the parts into a single preceramic polymer assembly for conversion to ceramic parts.

"Preceramic" in this disclosure simply refers to the capability to be ultimately converted to a ceramic material. It is noted that the disclosed preceramic resin formulations are precursors to preceramic polymers, which themselves are precursors to ceramic materials. As intended herein, a "resin" means a composition capable of being polymerized or cured, further polymerized or cured, or crosslinked. Resins may include monomers, oligomers, prepolymers, or mixtures thereof. The resin is preferably UV-curable to enable definition of three-dimensional shapes via a 3D-printing process.

A variety of methods may be employed to create parts to be joined. In general, the parts may be created using additive manufacturing, subtractive manufacturing, or casting. Additive manufacturing refers to any process by which 3D objects are constructed by successively depositing material in layers such that the 3D object becomes a predesigned geometry. Subtractive manufacturing refers to any process by which 3D objects are constructed by successively cutting material away from an initial amount of material. Combined or iterative additive/subtractive manufacturing may also be employed.

Some methods of additive manufacturing include stereolithography or digital light projection, binder jetting, polyjetting, extrusion printing, or a combination thereof. Some methods of subtractive manufacturing include electrical discharge machining, electrochemical erosion, electron beam machining, photochemical machining, ultrasonic machining, laser cutting, or water jet cutting. Casting includes casting of monomer resins which cure in a mold, as well as casting of molten polymers which harden in a mold.

Liquid resin (monomer formulation) layers may be cured from the top down or bottom up using stereolithography (SLA), digital light projection (DLP), UV-laser rastering, projection micro-stereolithography, or liquid crystal device projection, for example.

A stereolithography technique provides a method to build a 3D polymer microstructure in a layer-by-layer process. This process usually involves a platform (e.g., substrate) that is lowered into a photomonomer bath in discrete steps. At each layer, a laser is used to scan over the area of the photomonomer that is to be cured (i.e., polymerized) for that particular layer. Once the layer is cured, the platform is lowered by a specific amount, determined by the processing parameters and desired feature/surface resolution, and the process is repeated until the complete 3D structure is created. One example of such a stereolithography technique is disclosed in U.S. Pat. No. 4,575,330 issued Mar. 11, 1986 to Hull et al., which is hereby incorporated by reference herein. The polymer resolution may be improved by using laser optics and special resin formulations. Also, a dynamic pattern generator may be employed to cure an entire layer at once. See Bertsch et al., "Microstereo-lithography: A Review," *Materials Research Society Symposium Proceedings*, Vol. 758, 2003, which is hereby incorporated by reference herein.

In binder jetting, resin (monomer formulation) is jetted on selected locations and cured. This process is similar to conventional binder jetting methods, but instead of a binder, a preceramic monomer formulation is used. This process may be repeated many times.

In polyjetting, a mixture of liquid resin (monomer formulation) is deposited or sprayed by a nozzle and written into the desired pattern. As the mixture is dispensed, it is exposed to UV light such as a laser, LED, or plasma sources, and cured into a polymer. Multiple mixtures are able to be dispensed through different nozzles, allowing for more than one type of monomer mixture to be utilized simultaneously. This results in tailored mechanical properties for the final ceramic structure (following pyrolysis).

In extrusion printing, the resin mixture is squeezed through a micro-nozzle, or multiple micro-nozzles, and cured via UV light. One advantage is that high-aspect-ratio fillers (if present) can be aligned with the extrusion process. Alignment generally improves mechanical properties in the aligned direction.

In casting, a mold is filled with a liquid resin, which then hardens. Some embodiments employ gravity casting in which the resin is poured into the mold and pulled down into all portions of the mold by gravity. Air bubbles can be removed in a vacuum chamber. Pressure and/or centrifugal force can be used to help push the liquid resin into all details of the mold. The mold can also be vibrated to expel bubbles.

Typically, but not necessarily, a monomer formulation is conveyed (printed) to a region of interest, such as via stereolithography, binder jetting, polyjetting, extrusion printing, or casting, either followed by polymerization or with polymerization taking place simultaneously with the printing. Preferably, the polymerizing and conveying steps are performed simultaneously, at a desired location (e.g., a layer) within a part. In some embodiments, the polymerizing and conveying steps are performed semi-simultaneously. It is also possible, in some embodiments, to first polymerize a preceramic resin formulation, followed by conveying (e.g., 3D printing or casting) of the already-made polymer—especially when the polymer is a thermoplastic material.

Some variations of the invention provide a process for fabricating a ceramic structure, the process comprising:

(a) producing a plurality of preceramic polymer parts;

(b) chemically, physically, and/or thermally joining the preceramic polymer parts together, to generate a preceramic polymer structure;

(c) thermally treating the preceramic polymer structure, to generate a ceramic structure; and (d) recovering the ceramic structure.

Step (a) may employ additive manufacturing, subtractive manufacturing, casting, or a combination thereof. In some embodiments, the process further comprises disposing a composite overwrap onto the preceramic polymer structure, as will be explained in more detail below.

The ceramic structure may include a ceramic material selected from the group consisting of silicon oxycarbide, silicon carbide, silicon nitride, silicon oxynitride, silicon carbonitride, silicon boronitride, silicon boron carbonitride, boron nitride, and combinations thereof. In some embodiments, the ceramic structure has at least one dimension of about 1 meter or greater, and is a fully integrated ceramic object with no seams.

The step of recovering the ceramic structure at least includes obtaining the ceramic structure that results from thermally treating the preceramic polymer structure, so that the ceramic structure can be further processed, stored, packaged, shipped, or otherwise handled commercially. Typically, the ceramic structure is recovered from an oven or other thermal-treatment unit and allowed to cool. When a removable, non-sacrificial core or mold is employed (as explained below), the core or mold is removed in the step of recovering the ceramic structure. When locating device is employed (as explained below, to position the ceramic structure being assembled), the locating device is removed from the ceramic structure during the step of recovering the ceramic structure.

The present invention also provides a ceramic structure produced by a process comprising:

(a) producing a plurality of preceramic polymer parts;
(b) chemically, physically, and/or thermally joining the preceramic polymer parts together, to generate a preceramic polymer structure;
(c) thermally treating the preceramic polymer structure, to generate a ceramic structure; and
(d) recovering the ceramic structure, wherein the ceramic structure has at least one dimension of about 1 meter or greater, and
wherein the ceramic structure is a fully integrated ceramic object with no seams.

Some variations provide a method of fabricating a ceramic structure, the method comprising:

(a) selecting an overall ceramic structure geometry;
(b) selecting a plurality of ceramic sub-structure geometries as geometric components of the overall ceramic structure geometry;
(c) making a plurality of preceramic polymer parts that have at least some of the ceramic sub-structure geometries selected in step (b);
(d) chemically, physically, and/or thermally joining the preceramic polymer parts together, to generate a preceramic polymer structure; and
(e) thermally treating the preceramic polymer structure, to generate a ceramic structure that has the overall ceramic structure geometry selected in step (a).

As intended herein, "ceramic structure geometry" generally refers to the geometry (in three dimensions) of a ceramic structure. "Overall ceramic structure geometry" refers to the three-dimensional geometry of a desired final ceramic structure, i.e. for the intended engineering or commercial application. "Ceramic sub-structure geometry" refers to the three-dimensional geometry of an individual part that will be a component of the desired final ceramic structure. As a simple example, consider an I-beam with a top flange, bottom flange, and central web. The I-beam geometry can be partitioned into three rectangular sub-structure geometries for the top and bottom flanges and the web. An example is in FIG. 2, which shows a desired final ceramic structure 250 having overall ceramic structure geometry that can be partitioned into four sub-structure geometries for preceramic polymer parts 210, 220, 230, and 240, respectively.

An overall ceramic structure geometry is selected in step (a) based on the desired final part or object for the intended application. A plurality of ceramic sub-structure geometries are selected as geometric components (i.e., three-dimensional regions) of the overall ceramic structure geometry. The plurality of ceramic sub-structure geometries is at least 2 and can be 3, 4, 5, 6, 7, 8, 9, 10, about 25, about 50, about 100, or more, depending on part complexity. As will be appreciated, for a given overall ceramic structure geometry, there are multiple ways in which the overall part geometry can be divided into sub-structure geometries. Computer-aided optimization may be employed to select the plurality of ceramic sub-structure geometries in a mesh design. Such optimization may control or favor mechanical properties at joints, material costs, fabrication time, other factors, or a combination thereof.

The preceramic polymer parts are joined together chemically, physically, and/or thermally, to generate a preceramic polymer structure. Note that when there are more than 2 preceramic polymer parts to be joined together, each individual preceramic polymer part is not necessarily joined to every other individual preceramic polymer part (see, for example, FIG. 2). Rather, each individual preceramic polymer part is joined to at least one other preceramic polymer part, and certain preceramic polymer parts may be joined to multiple parts (e.g., element 240 is joined to each of elements 210, 220, and 230 in FIG. 2).

At least two distinct parts are fabricated from materials such as those disclosed above. In various embodiments, the number of distinct parts produced is 2, 3, 4, 5, 6, 7, 8, 9, 10 or more. After the individual parts are fabricated, they are joined physically, chemically, thermally, or using a combination of forces. Physical forces for bonding include mechanical pressing, mechanical interlocking, adhesion, cohesion, absorption, and adsorption. Chemical forces for bonding include hydrogen bonding, covalent bond formation, and ionic bond formation (i.e., electrostatic bonding). Thermal bonding may be accomplished by providing heat to increase temperature of the parts. Heat may be provided externally (e.g., an oven or heat-transfer medium), or via electrically resistive heating, microwaves, or induction heating, for example. Electromagnetic forces (e.g., from UV light) may be employed to assist with desired chemistry, such as polymerization or curing. Some embodiments employ joining of additively manufactured preceramic parts utilizing the same resin formulation as that employed for the initial additive manufacturing process.

Combinations of forces may be utilized, simultaneously or sequentially. For example, a combination of mechanical interlocking and covalent bond formation may be employed. As another example, a monomer resin may be applied as an adhesive between parts, which are then mechanically pressed together, followed by UV curing to form chemical bonds between the parts. Also, combinations may be useful with respect to different parts to be joined. For instance, larger parts could be joined using one technique, while other, small-feature parts could be joined in another way.

In some embodiments, the preceramic parts are held together before and/or during bonding by the use of mechanical means such as pins, hooks, bolts, rivets, screws, or other mechanisms. The mechanical means may be temporary and removal, or may be designed into the polymer part itself.

In some embodiments, the preceramic parts are joined via chemical bonding with a monomer resin. The monomer resin used for bonding (i.e., joining preceramic polymer parts) may be a UV-curable resin selected from siloxanes, carbosilanes, silanes, silazanes, silsesquioxanes, phenolics, or a combination thereof. When the bonding resin is subjected to a light or heat source to cause polymerization, the bonding resins polymerize. For example, carbosilane polymerizes to polycarbosilane, silane polymerizes to polysilane, and so on, as the case may be. Any of the compositions described in detail above, regarding preceramic polymer resins and polymers, may be employed as bonding resins as well. Optionally, at interfaces where parts are joined, additives may be applied for strength enhancement (or other reasons) so that in final ceramic object, mechanical properties are enhanced at specific locations without significant impact on material costs, for example.

In some embodiments, the materials contained in the bonding resin, when pyrolyzed, result in a ceramic material selected from the group consisting of silicon oxycarbide (SiOC), silicon carbide (SiC), silicon nitride ($Si_3N_4$), silicon oxynitride (SiON), silicon carbonitride (SiCN), silicon boronitride (SiBN), silicon boron carbonitride (SiBCN), boron nitride (BN), and combinations thereof, for example.

After the intermediate assembly (joining) of parts, the assembly may be post-cured with an optional thermal post-cure of the polymer prior to pyrolysis. A post-cure step may be employed to crosslink unreacted functional groups, for example. Post-curing may be accomplished by additional UV exposure and/or a thermal post-cure at elevated temperatures (such as 60-500° C.) in an oven for about 10 minutes to about 8 hours. When a thermal post-cure is to be done, it can be beneficial to include a thermal initiator in the initial composition, to facilitate later thermal curing. A high crosslink density can be desirable to prevent the fragmentation and loss of low-molecular-mass species during later pyrolysis.

When a composite overwrap is utilized, the overwrap may be soaked in a resin selected from the group consisting of carbosilane, silane, silazane, siloxane, borazine, phenolics, and combinations thereof. When the composite overwrap is subjected to a light or heat source to cause polymerization, the resins polymerize. For example, carbosilane polymerizes to polycarbosilane, silane polymerizes to polysilane, and so on, as the case may be. Any of the compositions described in detail above, regarding preceramic polymer resins and polymers, may be employed in composite overwraps as well.

In some embodiments, the resins contained in the composite overwrap, when pyrolyzed, result in a ceramic material selected from the group consisting of silicon oxycarbide (SiOC), silicon carbide (SiC), silicon nitride ($Si_3N_4$), silicon oxynitride (SiON), silicon carbonitride (SiCN), silicon boronitride (SiBN), silicon boron carbonitride (SiBCN), boron nitride (BN), and combinations thereof, for example.

The composite overwrap (when present) optionally contains a refractory filler, such as a metal carbide or metal oxide. Alternatively, or additionally, various fibers may be included in the composite overwrap. As meant herein, "fibers" refers to particles made from natural or synthetic substances that are significantly longer than they are wide. Fibers may have an aspect ratio, defined as average length to average diameter, of at least about 10, 20, 50, 100, or more. The high aspect ratio of fibers can improve mechanical properties of composites containing the fibers.

For example, the composite overwrap may include one or more fiber materials selected from the group consisting of carbon fibers, high-temperature ceramic fibers (e.g., silicon carbide, Si—C—O fibers, silicon nitride, or alumina fibers), glass fibers, or polymer fibers fabricated from any of the resin formulations disclosed herein or other polymer fibers (e.g., high-molecular-weight polyethylene fibers).

Some variations of the invention provide a process for fabricating a ceramic structure, the process comprising:

(a) producing a plurality of preceramic polymer parts;

(b) thermally treating each of the plurality of preceramic polymer parts, to generate a plurality of ceramic parts;

(c) joining the plurality of ceramic parts by disposing a preceramic composite overwrap scaffold onto the plurality of ceramic parts, to generate an intermediate structure;

(d) thermally treating the intermediate structure, to generate a ceramic structure; and (e) recovering the ceramic structure.

Optionally, step (c) further includes chemically, physically, and/or thermally joining the plurality of ceramic parts together, either prior to adding the preceramic composite overwrap scaffold, or after adding the scaffold.

The preceramic composite overwrap scaffold may include a material selected from the group consisting of carbon fibers, glass fibers, silicon carbide, Si—C—O fibers, silicon nitride, alumina fibers, polymer fibers, and combinations thereof. The preceramic composite overwrap scaffold may be infiltrated with a material selected from the group consisting of siloxanes, carbosilanes, silanes, silazanes, silsesquioxanes, borazines, phenolics, and combinations thereof.

FIG. 1 is an exemplary method flowchart according to some non-limiting embodiments. First, a plurality of preceramic polymer parts is fabricated from additive manufacturing, subtractive manufacturing, and/or casting. This step is repeated N times, wherein N is at least 2. On the Nth step, after the final part for the assembly is made, the N parts are joined chemically, physically, and/or thermally, such as by applying curable preceramic resin on assembly joints. A core or scaffold is optionally employed. If the core or scaffold is sacrificial, the preceramic resin is next cured, followed by pyrolysis of the assembly, during which the core or scaffold melts out or vaporizes. If the core or scaffold is removable, the preceramic resin is cured, followed by removal of the core or scaffold and then pyrolysis of the assembly. If there is no core or scaffold, the preceramic resin is cured after assembly and then the cured structure is pyrolyzed. Following pyrolysis (or other thermal treatment), the ceramic structure is recovered.

Figure 2:
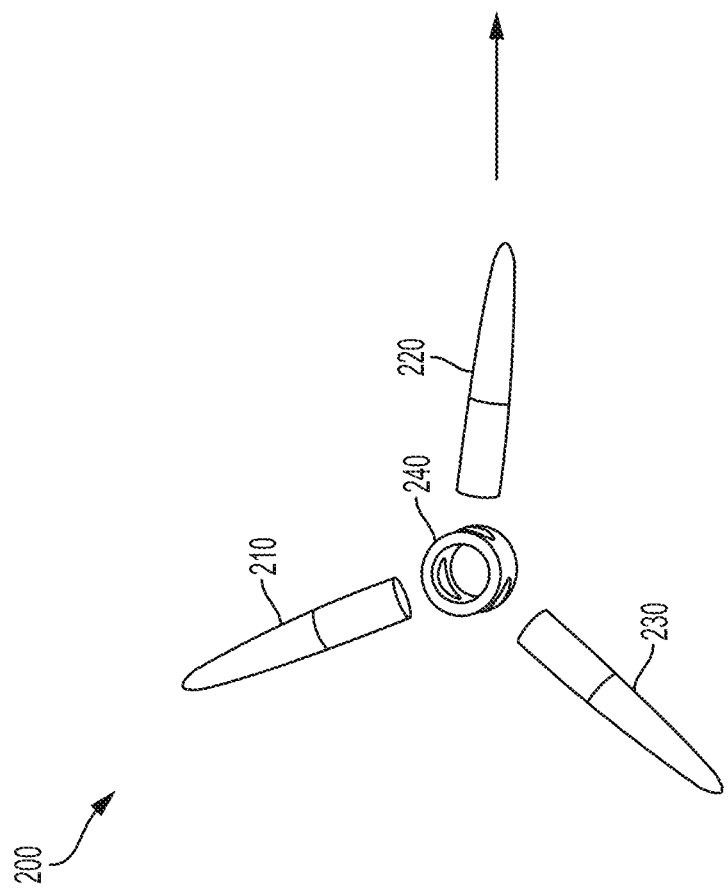
FIG. 2 is an exemplary embodiment of the invention, representing a wind turbine rotor or a propeller, for illustration purposes.

FIG. 2 is an exemplary embodiment 200, which may represent a wind turbine rotor or a propeller, for illustration only. Three separate rotor blades 210, 220, and 230 are joined into a central member 240, to produce a rotor assembly 250. The assembly 250 is a preceramic polymer part, prior to pyrolysis. Preceramic resin may be sandwiched between seams of each piece where connections with another piece are made (210/240, 220/240, and 230/240) and photopolymerized using a UV source or heat-cured in an oven or furnace (not shown).

In FIG. 2, photopolymerizable resin may be used to cure pieces 210, 220, 230, and 240 of preceramic polymer parts together, to arrive at polymer assembly 250. First, the resin is applied (e.g., dabbed, dipped, coated, sprayed, and/or brushed) directly onto the area of the pieces 210, 220, 230, and/or 240 to be bonded. The pieces 210, 220, 230, and 240 are then held together with or without the assistance of a mold or locating device. A UV source may be used to cure the photopolymer preceramic resin for an effective time, preferably at different orientations to facilitate curing in every area that the resin infiltrated. UV sources to cure the parts include, but are not limited to, LED UV sources, arc lamp UV sources, microwave-powered UV sources, and fluorescent UV sources.

Another technique for curing involves heat-curing the resin between the parts 210, 220, 230, and 240 at a temperature less than 500° C., such as from about 200° C. to about 450° C., e.g. about 250° C. to about 350° C.

FIG. 2 implies smooth surfaces on the bond faces. Alternatively, each of the bond surfaces may be structured in a way to help the parts fit together with greater accuracy. For example, a pin-locking feature may be designed into a part to provide a mechanical means of fastening. Subsequently, or simultaneously, uncured preceramic resin is applied to the part and subsequently cured using a UV source.

Figure 3A:
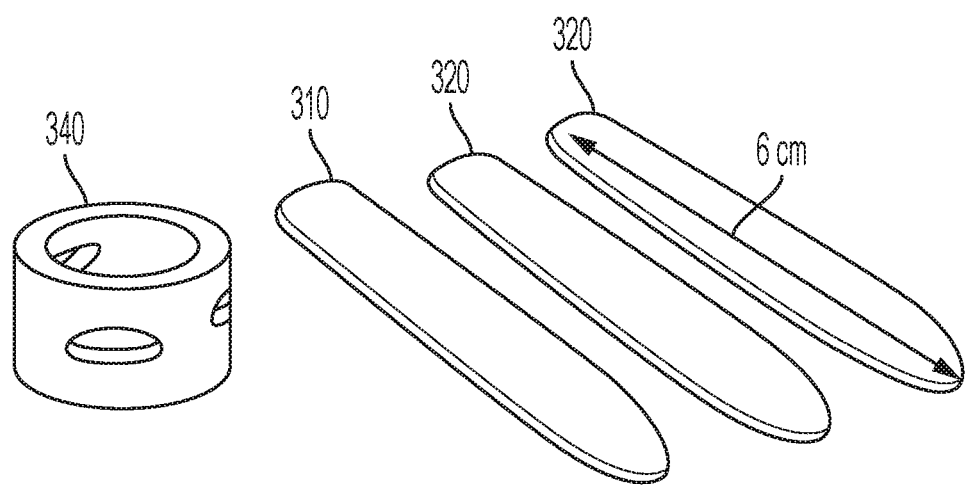
FIG. 3A is a photograph of multiple, individual polymer parts made from polysiloxane preceramic polymer, in the Example herein.
Figure 3B:
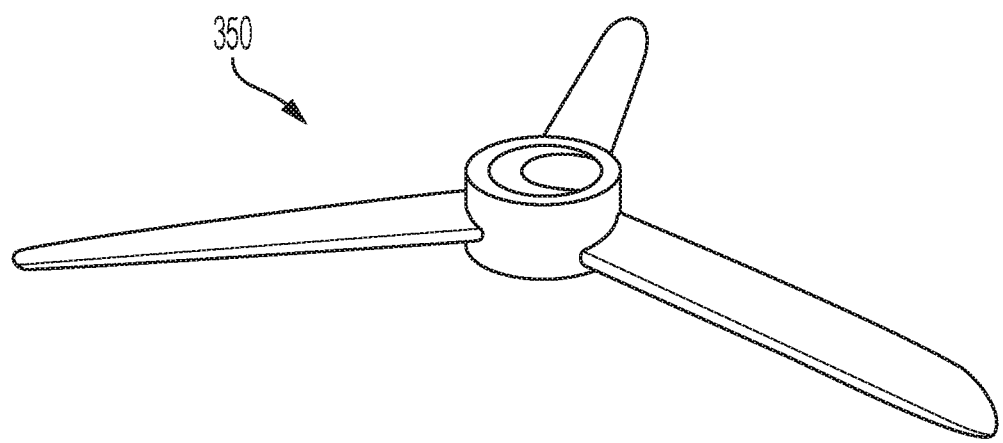
FIG. 3B is a photograph of an intermediate polymer assembly made from joining the individual polymer parts of FIG. 3A, in the Example herein.
Figure 3C:
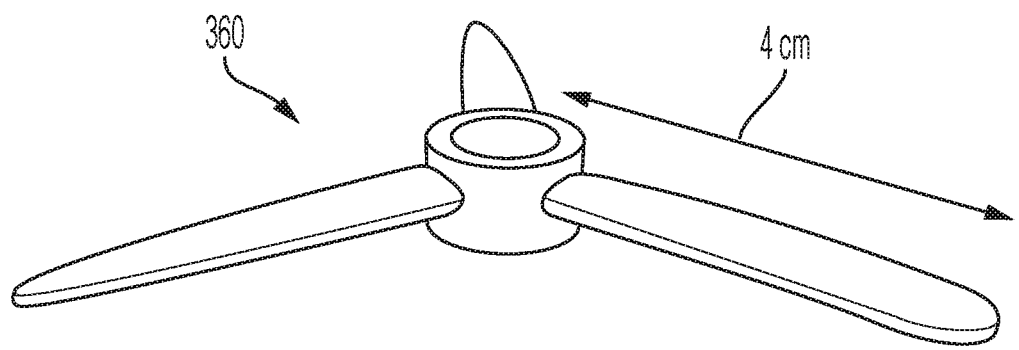
FIG. 3C is a photograph of a final ceramic assembly that is a SiOC-containing three-blade rotor made by pyrolyzing the intermediate polymer assembly of FIG. 3B, in the Example herein.

FIGS. 3A, 3B, and 3C in the Example herein demonstrate reduction to practice of the concept of FIG. 2, to produce a SiOC ceramic assembly (rotor with three blades).

Composite overwraps may also be included in the final part, if desired, depending on geometry or other factors. The composite overwrap may be applied at one or more exterior surfaces of the additively manufactured preceramic polymer. For example, a composite overwrap may be incorporated into a cylindrical shape either at the inner diameter, the outer diameter, or both the inner and outer diameter surfaces.

The composite overwrap may be in the form of layers or sheets, any may contain multiple materials. The composite overwrap may include fibers, in some embodiments. The composite overwrap is infiltrated with a preceramic monomer resin, phenolic resin, or forming resin. Preferably, the composite overwrap bonds to the preceramic polymer part and then pyrolyzes at the same rate as the additively manufactured core. The composite overwrap may provide strength and toughness to the final assembly and cover areas where the assembly was joined from multiple parts.

Figure 4:
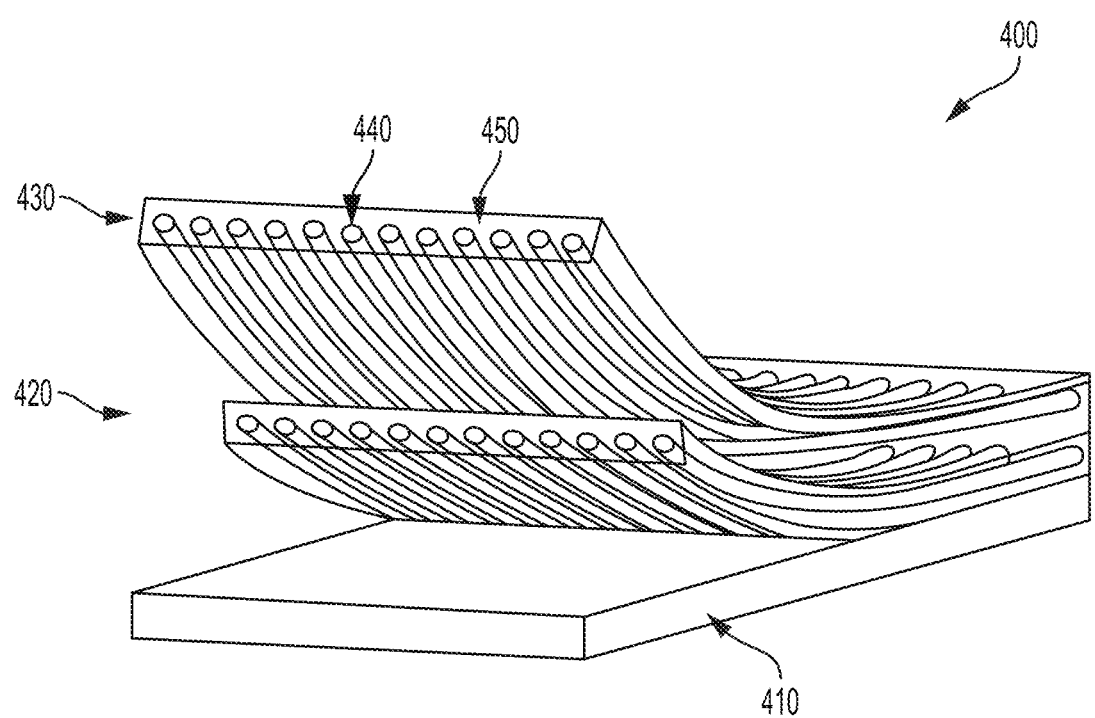
FIG. 4 is a sketch of an exemplary assembly that includes an additively manufactured preceramic polymer core and two layers of a composite overwrap disposed on the polymer core, in some embodiments.

FIG. 4 depicts a sketch of an exemplary assembly 400 that includes an additively manufactured preceramic polymer core 410 and two layers 420, 430 of a composite overwrap disposed on the polymer core 410. In a specific embodiment for producing a SiOC ceramic assembly, the composite overwrap layers 420 and 430 are fabricated from carbon fibers and polysiloxane preceramic resin, and the additively manufactured preceramic polymer core 410 is fabricated from polysiloxane preceramic resin.

Generally speaking, materials used for the composite overwrap may include the same preceramic polymer compositions used for the additively manufactured parts, although that is not necessary. In some composite overwraps, the preceramic polymer surrounds or impregnates high-temperature structural particles or fibers such as alumina, silicon carbide, boron, and/or carbon (which may be in the form of carbon fibers, graphene, etc.). The preceramic matrix material of the composite overwrap may also include a particulate filler, to aid in strength and processing.

Alternatively, or additionally, composite overwraps may be added after the additively manufactured preceramic polymer has been pyrolyzed (i.e. after conversion to a ceramic). In this case, the composite overwrap materials are placed onto the ceramic structure and cured in place (UV, thermally, etc.). The assembly, with the composite overwrap, is then pyrolyzed again to convert the matrix material of the composite overwrap to a ceramic. The ceramic matrix may develop cracks due to the rigidity of the high-temperature fibers and the additively manufactured ceramic core. Therefore, additional infiltration (of resin) and pyrolysis steps may be performed to fully densify the composite overwrap.

In some embodiments, the preceramic parts are held together with the use of a scaffold during bonding. The scaffold may be in the form of a mold that is disposed on the outside of preceramic parts, a core that is disposed on the inside of preceramic parts, or a combination thereof. The core or mold may be removable, after resin curing but before pyrolysis. Alternatively, or additionally, the core or mold may be sacrificial such that the core or mold melts out or vaporizes during subsequent pyrolysis.

If a core is created to mimic the shape of the full preceramic part, many pieces of preceramic polymer may be bonded to the core, bonded to each piece of preceramic polymer, and optionally bonded to a composite overwrap. In preferred embodiments, this core will burn out or melt out during the pyrolysis process, leaving a full ceramic part with no core residue.

In some embodiments, a locating device is used to position the assembly. The locating device may be sacrificial, i.e. it can melt out or be otherwise removed during the assembly process and/or the pyrolysis process. For example, a rod could be used to facilitate the assembly of cylindrically shaped preceramic polymer parts. The rod may be created with materials such as polylactide (PLA) or other polymers that can easily be removed, an investment casting resin, or wax, for example.

A wide variety of materials may be employed. In various embodiments, a preceramic polymer is produced or provided, in which the preceramic polymer is selected from the group consisting of polycarbosilane, polysilane, polysilazane, polysiloxane, polyborazine, and combinations thereof. In various embodiments, pyrolysis of a preceramic polymer results in a ceramic material selected from the group consisting of silicon oxycarbide (SiOC), silicon carbide (SiC), silicon nitride ($Si_3N_4$), silicon oxynitride (SiON), silicon carbonitride (SiCN), silicon boronitride (SiBN), silicon boron carbonitride (SiBCN), boron nitride (BN), and combinations thereof, for example.

Suitable monomer formulations to fabricate preceramic polymers will now be further described.

Some embodiments utilize a UV-curable monomer formulation comprising a first molecule containing two or more unsaturated C=X double bonds or C≡X triple bonds (or at least one C=X double bond and at least one C≡X triple bond). X is selected from C, S, O, N, or a combination thereof, so these functional groups include C=C double bond, C≡C triple bond, C=S, and C≡N. Any H atoms involved in these functional groups may be substituted with other atoms such as F or Cl, or side groups such as alkyl, ester, amine, hydroxyl, or CN. The first molecule may contain different combinations of these different unsaturated bonds. Typical unsaturated bonds are C=C double bonds at the terminal position of the molecules, in which three hydrogen atoms are bonded to carbon atoms on the C=C bonds (i.e., R—HC=$CH_2$ where R is the remainder of the first molecule). Other examples of these functional groups include vinyl, ethynyl, vinyl ether, vinyl ester, vinyl amide, vinyl triazine, vinyl isocyanurate, acrylate, methacrylate, diene, triene, or a mixture thereof.

The first molecule also contains at least one non-carbon atom in the main chain or side chains of the first molecule. Examples of non-carbon atoms that may be used include, but are not limited to, Si, B, Al, Ti, Zn, O, N, P, S, Ge, and combinations thereof. The non-carbon atoms may be a part of cyclic or acyclic groups or structures within the first molecule. The non-carbon atoms are preferably not merely single non-carbon atoms ionically bonded at the end(s) of the first molecule. In some embodiments, when X is O, the non-carbon atom is not O; or when X is N, the non-carbon atom is not N.

Examples of the first molecules include, but are not limited to, trivinylborazine; 2,4,6-trimethyl-2,4,6-trivinylcyclotrisilazane; 1,3,5,7-tetravinyl-1,3,5,7-tetramethylcyclotetrasilazane; 1,3,5-trivinyl-1,3,5-trimethylcyclosiloxane; 1,3,5,7-tetravinyl-1,3,5,7-tetramethylcyclotetrasiloxane; 2,2,4,4,6,6-hexakisallyloxyltriazatriphosphinine; tetraallyloxysilane; vinyl-terminated polydimethylsiloxane; tetravinylsilane; vinyl-terminated polydimethylsiloxane-ethylene copolymer; divinyldimethylsilane; 1,2-divinyltetramethyldisilane; 1,4-bis(vinyldimethylsilyl)benzene; vinylmethylsiloxane homopolymer; methacryloxypropyl-terminated polydimethylsiloxane; boron vinyldimethyl siloxide; vinylmethylsiloxane-dimethylsiloxane copolymer, trimethyl siloxy-terminated homopolymer; vinylethoxysiloxane-propylethoxysiloxane copolymer; vinyltrimethoxysilane; trivinylmethylsilane; diallyldimethylsilane; 1,3,5-trisilacyclohexane; B,B'B"-trithynyl-N,N'N"'-trimethylborazine; B,B'B"-triethynylborazine; vinylmethoxysiloxane, acryloxypropyl(methylsiloxane) homopolymer; or a combination thereof.

The first molecule, when present, may be up to about 100 wt % of the monomer formulation. In various embodiments, the first molecule is about 5, 10, 20, 30, 40, 50, 60, 70, 80, 90, or 95 wt % of the monomer formulation.

In some embodiments, the UV-curable monomer formulation comprises a second molecule with a structure R—Y—H, wherein Y=O, S, N, or combinations thereof. The molecules R—Y—H can provide two or more YH groups for polymerization, and can be part of cyclic or acyclic structures. Typical YH groups are SH groups, e.g. thiol or mercapto groups. The R groups can be organic groups such as alkyl groups, ester groups, amine groups, or hydroxyl groups, or inorganic non-carbon-containing atoms or groups. Examples of inorganic non-carbon atoms or groups in the second molecule include, but are not limited to, Si, B, Al, Ti, Zn, P, Ge, S, O, N, or combinations thereof. The reaction rate varies depending on the different molecules utilized. In some preferred embodiments, a thiol is employed with at least half of the main chain made of inorganic atoms, such as silicon, Other atoms in the main chain may include oxygen, nitrogen, and/or carbon.

The second molecule, when present, may be up to about 97 wt % of the monomer formulation. In various embodiments, the second molecule is about 0, 5, 10, 20, 30, 40, 50, 60, 70, 80, or 90 wt % of the monomer formulation. The second molecule may be present whether or not the first molecule is present.

Exemplary second molecule include, but are not limited to, pentaerythritol tetrakis(3-mercaptopropionate); trimethylolpropanetris(2-mercaptoacetate); trimethylolpropane tris(3-mercaptopropionate); tetrakis(dimethyl-3-mercaptopropylsiloxy)silane; tetrakis(dimethyl-2-mercaptoacetate siloxy)silane; (mercaptopropyl)methylsiloxane-dimethylsiloxane copolymer; (mercaptopropyl)methylsiloxane homopolymer; pentaerythritol tetrakis(2-mercaptoacetate); or a combination thereof.

In some embodiments, the UV-curable monomer formulation comprises a third molecule with a structure R—Y, wherein Y is selected from an aliphatic ether, a cyclic ether, a vinyl ether, an epoxy, a cycloaliphatic epoxy, an oxcetane group, or a combination thereof. The R groups may be selected from organic groups such as alkyl groups, ester groups, amine groups, or hydroxyl groups, or inorganic non-carbon containing atoms or groups. Examples of inorganic non-carbon atoms or groups in the second molecule include, but are not limited to, Si, B, Al, Ti, Zn, P, Ge, S, O, N, or combinations thereof. The inorganic non-carbon atoms or groups may be a part of cyclic or acyclic structures.

Exemplary third molecules include, but are not limited to, epoxy-functional dimethylpolysiloxane and/or epoxycyclohexylethyl methylsiloxane/dimethylsiloxane. These monomers can consist of 0 to 100% of the monomer formulation.

The third molecule, when present, may be up to about 100 wt % of the monomer formulation. In various embodiments, the third molecule is about 5, 10, 20, 30, 40, 50, 60, 70, 80, 90, or 95 wt % of the monomer formulation. The third molecule may be present whether or not the first or second molecules are present.

In some embodiments, the UV-curable monomer formulation comprises a photoinitiator that generates free radicals under light exposure by intramolecular bond cleavage or intermolecular hydrogen abstraction. The photoinitiator may be active in the presence of light having a wavelength from about 200 nm to about 500 nm, for example. Photoinitiators may be used when the polymerization is, or includes, free-radical polymerization. Photoinitiators may be used to initiate polymerization when exposed to other wavelengths, such as in the visible spectrum. In certain embodiments, light exposure is produced from light having one or more wavelengths selected from about 200 nm to about 700 nm, such as about 250, 300, 350, 400, 500, or 600 nm.

Different photoinitiators will generally result in different reaction rates for polymerization. A combination of different types of photoinitiators may be used in the polymerization process. More than one photoinitiator may be included to allow multi-wavelength curing, for example.

Examples of photoinitiators include, but are not limited to, 2,2-dimethoxy-2-phenylacetophenone; 2-hydroxy-2-methylpropiophenone; camphorquinone; bis(2,4,6-trimethylbenzoyl)-phenylphosphineoxide; benzophenone; benzoyl peroxide; thioxanones; dicumyl peroxide; 2,2'-azobisisobutyronitrile; camphorquinone; oxygen; nitrogen dioxide; or a combination thereof.

The photoinitiator, when present, may be up to about 10 wt % of the monomer formulation. In various embodiments, the photoinitiator is about 0.001, 0.005, 0.01, 0.05, 0.1, 0.5, 1, 2, 5, or 10 wt % of the monomer formulation.

In some embodiments, the UV-curable monomer formulation comprises a free-radical inhibitor added in a sufficient amount to the monomer formulation to inhibit unwanted polymerization of regions outside the desired printing area. A free-radical inhibitor can improve resolution to the desired part in embodiments that employee free-radical polymerization. A free-radical inhibitor can also deter shadow curing, which is normally not desired.

Exemplary free-radical inhibitors include, but are not limited to, hydroquinone, methylhydroquinone, ethylhydroquinone, methoxyhydroquinone, ethoxyhydroquinone, monomethylether hydroquinone, propylhydroquinone, propoxyhydroquinone, tert-butylhydroquinone, n-butylhydroquinone, or a combination thereof. When present, the free-radical inhibitor may be up to about 5 wt % of the monomer formulation, such as about 0.001, 0.005, 0.01, 0.05, 0.1, 0.2, 0.5, 1, or 2 wt % of the monomer formulation.

Optionally the formulation further includes a radiation-trigger free-radical initiator that is active at a wavelength substantially different from the photoinitiator. When the preceramic resin formulation includes a thermal free-radical initiator, optionally the formulation further includes a radiation-trigger free-radical initiator.

In some embodiments, the UV-curable monomer formulation comprises a free-radical thermal initiator that generates free radicals under elevated temperature conditions. The addition of a free-radical thermal initiator allows for multiple-mechanism curing in the formulation, i.e., both UV curing and thermal curing, or allows for a different polymerization reaction rate. One or a combination of different types of thermal initiators may be used in the polymerization process.

A thermal initiator may be used to crosslink unreacted vinyl groups remaining which have not reacted with the thiol group or to react the vinyl group with other available functional groups such as methyl or hydro groups on the first or second molecule, creating a second type of reaction mechanism. A thermal post-cure after 3D printing may be done, such as by heating the polymer structure up to 300° C.

Exemplary free-radical thermal initiators include, but are not limited to, benzoyl peroxide, dicumyl peroxide, 2,2'- azobisisobutyronitrile, or a combination thereof. When present, the free-radical thermal initiator may be up to about 10 wt % of the monomer formulation, such as about 0.001, 0.01, 0.1, 1, 2, or 5 wt % of the monomer formulation.

In some embodiments, the UV-curable monomer formulation comprises a cationic photoinitiator or photoacid generator, such as (but not limited to) sulphonium, iodonium, and/or ferrocenium cation paired with a non-nucleophilic anion. For example the UV-curable resin may contain a salt which under light exposure creates Brønsted acids by cleavage of the sulphonium, iodonium, and/or ferrocenium cation of the onium salt, paired with a proton donor. Cationic photoinitiators are typically active under light wavelengths from 200 nm to 350 nm. Initiators that are active at lower or higher wavelengths are also applicable to these monomer formulations. Cationic photoinitiators or photoacid generators may be used when the polymerization is, or includes, cationic polymerization. Different cationic photoinitiators or photoacid generators will generally result in different reaction rates for polymerization. A combination of different types of cationic photoinitiators and/or photoacid generators may be used in the polymerization process.

Exemplary cationic photoinitiators or photoacid generators include, but are not limited to, sulfonium, iodonium, and ferrocenium salts; cyclopentacienylcumene-iron hexafluoro phosphate; diphenyliodonium phosphate; triarylsulfonium hexafluoroantimonate; or a combination thereof.

The cationic photoinitiator or photoacid generator, when present, may be up to about 10 wt % of the monomer formulation. In various embodiments, the cationic photoinitiator or photoacid generator is about 0.001, 0.005, 0.01, 0.05, 0.1, 0.5, 1, 2, 5, or 10 wt % of the monomer formulation.

In certain embodiments, the UV-curable monomer formulation comprises a hydrogen donor that may be used to assist in the generation of a Brønsted acid in the cation or in acceleration of anionic photoinitiator reactions, for example. Exemplary hydrogen donors include, but are not limited to, tertiary amines, alcohols, ethers, esters, water, or a combination thereof. When present, the hydrogen donor may be up to about 2 wt % of the monomer formulation, such as about 0.001, 0.005, 0.01, 0.05, 0.1, 0.5, 1, or 1.5 wt % of the monomer formulation.

In some embodiments, the UV-curable monomer formulation comprises a UV sensitizer that may be used to enable the long-UV-wavelength reaction of UV systems with photoinitiators which typically absorb at lower wavelengths. This is typically the case with cationic photoinitiators, which are generally limited to absorption at about 325-375 nm, for example. UV sensitizers interact with UV light at higher wavelengths, generally into the 375-425 nm range, and then interact with the photoinitiator to create either free radicals and/or acids, such as Brønsted acids. A UV sensitizer forms an excited triplet state under UV light absorption, and then via electron or energy transfer, reacts with a photoinitiator to generate free radicals and/or Bronsted acids. This initiates photopolymerizaton.

UV sensitizers may be selected from dibutoxyantracene, diethoxyanthracene, 1-chloro-4-propoxythioxanthone, 2-isopropylthioxanthone, 4-isopropylthioxanthone, or a combination thereof. When present, the UV sensitizer may be up to about 5 wt % of the monomer formulation, such as about 0.001, 0.005, 0.01, 0.05, 0.1, 0.5, 1, 2, 3, or 4 wt % of the monomer formulation.

In some embodiments, including those utilizing free-radical polymerization, cationic polymerization, or both of these, the UV-curable monomer formulation comprises one or more 3D-printing resolution agents selected from UV absorbers, fluorescents, optical brighteners, or a combination thereof.

A "3D-printing resolution agent" is a compound that improves print quality and resolution by containing the curing to a desired region of the laser or light exposure. In certain embodiments, the 3D-printing resolution agent functions by absorbing light at a desired wavelength and converting the energy either into thermal energy or radiation at a higher wavelength. The use of 3D-printing resolution agents improves print quality and resolution by containing the curing by the laser or light exposure to the desired region laterally and/or vertically in the print bath.

Exemplary 3D-printing resolution agents include, but are not limited to, 2-(2-hydroxyphenyl)-benzotriazole; 2-hydroxyphenyl-benzophenones; 2-hydroxyphenyl-s-triazines; 2,2'-(2,5-thiophenediyl)bis(5-tert-butylbenzoxazole); 2,2'-(1,2-ethenediyl)bis(4,1-phenylene)bisbenzoxazole; or a combination thereof. When present, the 3D-printing resolution agent may be up to about 10 wt % of the monomer formulation, such as about 0.001, 0.01, 0.1, 0.5, 1, 2, 3, 4, 5, 6, 7, 8, or 9 wt % of the monomer formulation.

Some variations utilize a preceramic resin formulation comprising:

(a) a first molecule comprising two or more C=X double bonds, two or more C≡X triple bonds, or at least one C=X double bond and at least one C≡X triple bond, wherein X is selected from the group consisting of C, S, N, O, and combinations thereof, and wherein the first molecule further comprises at least one non-carbon atom selected from the group consisting of Si, B, Al, Ti, Zn, P, Ge, S, N, O, and combinations thereof;

(b) optionally a second molecule comprising R—Y—H, wherein R is an organic group or an inorganic group, and wherein Y is selected from the group consisting of S, N, O, and combinations thereof (Y is not yttrium in this specification);

(c) a photoinitiator and optionally a thermal free-radical initiator;

(d) a free-radical inhibitor; and (e) a 3D-printing resolution agent.

In some embodiments, the first molecule is present from about 3 wt % to about 97 wt % of the formulation, such as about 4, 5, 10, 15, 20, 25, 30, 35, 40, 45, 50, 55, 60, 65, 70, 75, 80, 85, 90, or 95 wt %, for example.

In some embodiments, the first molecule contains two or more C=X double bonds, and at least one of these double bonds is located at a terminal position of the first molecule. In some embodiments, the first molecule contains two or more C≡X triple bonds, and at least one of these triple bonds is located at a terminal position of the first molecule. In some embodiments, the first molecule contains at least one C=X double bond and at least one C≡X triple bond, and the C=X double bond is located at a terminal position, or the C≡X triple bond is located at a terminal position, or both of the C=X double bond and the C≡X triple bond are located at (different) terminal positions within the first molecule. Note that a molecule may contain more than two terminal positions, when there is branching present.

In the first molecule, the non-carbon atom may be present in the main chain, in side chains, or in both of these.

The first molecule may include one or more functional groups selected from the group consisting of vinyl, ethynyl, vinyl ether, vinyl ester, vinyl amide, vinyl triazine, vinyl isocyanurate, acrylate, methacrylate, diene, triene, and analogues thereof. In some embodiments, the first molecule includes two or more of such functional groups. An "analogue" herein means that the functional group has similar chemical and reactive properties, with respect to the polymerization of the preceramic resin formulation.

In some embodiments in which the second molecule is included in the preceramic resin formulation, the second molecule is present from about 0.1 wt % to about 97 wt % of the formulation, such as about 0.2, 0.5, 1, 2, 3, 4, 5, 10, 15, 20, 25, 30, 35, 40, 45, 50, 55, 60, 65, 70, 75, 80, 85, 90, or 95 wt %, for example.

The second molecule may include one or more functional groups selected from the group consisting of thiol, alkyl, ester, amine, hydroxyl, and functional analogs thereof. Alternatively, or additionally, the second molecule may be chemically contained within one or more functional groups selected from the group consisting of thiol, alkyl, ester, amine, hydroxyl, and analogues thereof.

When the second molecule is present, the R group may be, or include, an inorganic group containing an element selected from the group consisting of Si, B, Al, Ti, Zn, P, Ge, S, N, O, and combinations thereof.

In some embodiments, at least 5%, 10%, 15%, 20%, 25%, 30%, 35%, 40%, 45%, or 50% (mole percent) of the R group is inorganic, i.e. not carbon. In certain embodiments, at least 5%, 10%, 15%, 20%, 25%, 30%, 35%, 40%, 45%, or 50% (mole percent) of the R group is specifically Si.

In the second molecule, the R group may be present in the main chain, in side chains, or in both of these. The non-carbon atom of the R group, when it is inorganic, may be the same as or different than the non-carbon atom in the first molecule.

The weight ratio of second molecule to first molecule may vary from about 0 to about 32, such as about 0.5, 1, 2, 3, 5, 10, 15, 20, 25, or 30. In some embodiments, the weight ratio of second molecule to first molecule is dependent on the ratio of thiol to vinyl. For example, in certain embodiments there is at least one thiol functional group available per vinyl group.

In some embodiments, a solid-phase filler is included in the preceramic monomer formulation. A "solid-phase filler" as meant herein is a material that (a) forms at least one solid phase at 25° C. and 1 atm, and (b) enhances at least one chemical, physical, mechanical, or electrical property within the UV-curable monomer formulation or a reaction product thereof. The solid-phase filler, among other benefits, can improve mechanical properties, especially the fracture toughness of the (otherwise) brittle ceramic material, and in some cases, thermal properties.

In particular, the preceramic monomer formulations may be loaded with a dissimilar solid material, or multiple solid materials, as solid-phase fillers to form polymer composite parts that can be directly converted to ceramic matrix composites (CMCs) via pyrolysis or other thermal treatment. The solid-phase fillers at least partially survive the pyrolysis conditions. Exemplary solid-phase fillers include, but are not limited to, SiC, C, $Al_2O_3$, $SiO_2$, mullite ($Al_2O_3$—$SiO_2$), $Si_3N_4$, SiAlON, BN, and/or YAG ($Y_3Al_5O_{12}$).

The solid-phase filler may be from about 0.1 vol % to about 70 vol % of the monomer formulation, with the majority of the remainder typically being liquid-phase UV-curable monomer. The geometric shape of the solid-phase filler may be fibers including short fibers (1-100 micrometers in length) or long fibers (>100 micrometers in length), whiskers, nanotubes, nanorods, flat platelets, microparticles with diameters between 1 and 100 micrometers, nanoparticles with diameters between 1 and 1000 nanometers, or a combination thereof.

To increase fracture toughness of a 3D-printed part, solid-phase fillers with aspect ratios of at least 2 are preferred, such as fibers, whiskers, nanotubes, and nanorods. Here, "aspect ratio" is the ratio of average length to average width, or in the case of an arbitrary shape, the ratio of average maximum length scale to average minimum length scale. The solid-phase filler aspect ratio is preferably at least 5, more preferably at least 10, in certain embodiments.

The solid-phase filler (when present) may have a range of compositions. Solid-phase filler compositions include, but are not limited to, silicon-based ceramics such as SiOC, $SiO_2$, SiCN, SiC, SiCBN, $Si_3N_4$, silicate glasses, etc. Solid-phase filler compositions include non-silicon-based ceramics such as metal oxides, e.g. $Al_2O_3$, $ZrO_2$, $TiO_2$, or $Y_3Al_5O_{12}$. Solid-phase filler compositions include carbon-based, high-temperature materials such as carbon, graphene, diamond, and metal carbides, e.g. TiC, ZrC, HfC, or $B_4C$. Solid-phase filler compositions include nitride-based ceramics, e.g. BN, TiN, ZrN, or AlN.

Solid-phase fillers interact with UV light according to Snell's law and the well-known Fresnel equations. These laws of physics determine the fractions of the light that are reflected, transmitted, or absorbed when UV light passes from resin to filler. For a UV-based 3D-printing process, it is preferred that the fillers do not absorb too much UV light which would hinder complete UV curing of the resin. To avoid absorption of too much UV light, a low level of solid-phase filler may be employed, such as less than 10 vol % of relatively small (e.g., 10 micron or smaller) particles. Alternatively, or additionally, a solid-phase filler that is somewhat transparent to UV light and lets UV light pass through, may be employed. Another approach to ensure that UV light is not excessively absorbed by the filler particles is to employ particles with a surface that reflects UV light. For example, aluminum reflects UV light well. For maximum reflection, the surface of such particle should be smooth. Surface treatments or coatings may be applied to render the surface of filler particles reflective-such as a thin coating of aluminum or silver.

Preferred solid-phase filler materials, in some embodiments, are short fibers of alumina ($Al_2O_3$), quartz ($SiO_2$), glass, silicon nitride ($Si_3N_4$), yttrium aluminum garnet (YAG), or boron nitride (BN) because these materials transmit at least some UV light. SiC or C fibers absorb too much UV light and therefore should to be coated with a reflective coating, to enable efficient 3D printing.

The solid-phase filler is preferably stable at a pyrolysis temperature of at least 800° C., so as not to disintegrate, melt, or vaporize during later conversion of a preceramic polymer to a ceramic material. Note that the solid-phase filler may react at pyrolysis temperatures with other components present in the monomer formulation or its reaction products (e.g., polymer). It is possible for a portion of the solid-phase filler to react away into the vapor phase, or into a liquid phase, during high-temperature processing.

In certain embodiments, a solid-phase filler precursor is introduced to the monomer formulation, wherein the precursor is in a liquid phase or is a gel, for example. The filler precursor may then react or undergo a phase change, such as during polymerization, to convert the filler precursor into a solid-phase filler.

Depending on the chemistry and viscosity of the monomer formulation (resin), the solid-phase filler may be treated to increase its compatibility with and wetting of the resin, the solubility and dispersion of the filler in the resin, and/or the bonding between the filler and the resin. In some embodiments, dispersion aides may be chosen to match the isoelectric point of the solid-phase filler particle and the chemistry and functionality of the monomer resin.

Some embodiments employ surfactants with a component which bonds to the surface of the filler and a component which solvates in the resin system. Surface functionality may be added to the surface of the solid-phase filler by covalently bonding a functional group to the surface of the filler. Examples include the use of silane surface modifiers with active groups that can either react with the chemistry of the resin or increase the wettability and dispersability in the solid-phase filler. These include the addition of mercapto trimethoxy silane, vinyl trimethoxy silane, 3-glycidyl oxypropyl trimethoxy silane, or a combination thereof, for example. The surface may also be modified through other chemical means, such as vapor-solid reactions or liquid-solid reactions, e.g. oxidation in a furnace or acid treatment.

For 3D printing and curing of the resin, it can also be advantageous (in some embodiments) if the solid-phase filler itself is coated or surface-treated with a chemical that contains a functional group that aids in polymerization or crosslinking of the resin on UV and/or thermal exposure. Such functional groups include unsaturated ethers, vinyls, acrylates, methacrylates, cyclic ethers, epoxies, oxetanes, amines, hydroxyls, isocyanates, hydrides, or combinations thereof. By adding functional groups to the surface of the solid-phase filler, fewer or even no functional groups are necessary in the resin and the system can still be cured by UV exposure. Alternatively, or additionally, functional groups introduced to the surface of the solid-phase filler particles may enable a thermal cure after initial UV curing during 3D printing.

The solid-phase filler may be coated to protect it from environmental degradation during pyrolysis. Reactive species such as oxygen free radicals, and other free radicals, may be generated during the pyrolysis. Such free radicals can react with the fillers and degrade their properties. To mitigate this, the fillers may be coated with a thin layer of a protective material such as BN or a sacrificial material such as pyrolytic carbon that preferentially decomposes during pyrolysis.

To increase fracture toughness of a 3D-printed ceramic matrix composite, a high-aspect-ratio filler, such as a fiber, may be coated with a filler/matrix interfacial coating. The purpose of this coating is to provide a weak filler-matrix interface that prevents matrix cracks from penetrating the fillers-thus providing damage tolerance (toughness) to the composite. The interfacial coating is preferably chemically and mechanically stable during processing and pyrolysis. Examples of interfacial coatings include BN, C, AlN, or a combination thereof.

The direct, near-net-shape conversion of a preceramic polymer to a ceramic structure may be achieved by pyrolysis or other thermal treatment, such as (but not limited to) sintering, annealing, or calcination. Typically, the thermal treatment is based on heating the polymer structure (following joining of individual parts) for an extended period of time (such as from 10 minutes to 1 week) under various inert or reactive atmospheres.

Thermal treatment may be done for an extended period of time under various atmospheres, including but not limited to $N_2$, Ar, He, air, $CO_2$, $CH_4$, $C_2H_6$, $C_2H_4$, $NH_3$, or a combination thereof. Treatment pressures may vary from about 1 atm to about 20 atm, for example. Vacuum pyrolysis may also be employed, in which the treatment pressure is less than 1 atm, again under various atmospheres as noted above.

The pyrolysis or other thermal treatment may include heating at a heating rate of 0.1-20° C./min from ambient temperature to an elevated temperature from about 500° C. to about 1500° C., such as from about 800° C. to about 1100° C. These slow heating rates are preferred to enable evolving gases to escape, thereby minimizing porosity in the final part. When porosity is desired, higher heating rates (e.g., higher than 20° C./min) may be employed. The pyrolysis or other thermal treatment may also include dwelling at the elevated temperature (e.g., 950° C.) for at least 1, 5, 10, 15, 30, or 60 minutes. Following pyrolysis, the material may be cooled at a cooling rate (magnitude) of 0.1-20° C./min back to ambient temperature. In some embodiments, faster cooling (e.g., higher than 20° C./min in magnitude) is desired to freeze-in a desired microstructure, for example.

The thermal treatment is preferably performed following polymerization, joining, and any (optional) thermal post-cure of the 3D polymer. In certain embodiments, the thermal treatment is combined (i.e., overlaps in time and/or temperature) with polymerization, thermal post-cure, joining, or some combination thereof. It will also be recognized that even when a sequential operation is intended, some amount of ceramic formation may occur prior to a planned step of thermal treatment, as a result of the intrinsic kinetics and thermodynamics of the reaction system.

In some embodiments, a reactive thermal treatment is performed, in which the gas that is initially present is reactive toward the initial polymer, the final ceramic material, or both of these. When the gas is reactive, it may react with a component and cause it to leave the material. Alternatively, or additionally, the gas may react with a component and remain with the base material. It is also possible for the gas to react and form products, some of which depart from the material while the rest remains with the material. Reactive gases may be selected from $O_2$, $O_3$, air, CO, $CO_2$, $H_2$, $H_2O$, $CH_4$, $SO_2$, $H_2S$, $NH_3$, NO, $NO_2$, and $N_2O$, and so on. The maximum temperature for reactive thermal treatment may be, for example, about 300° C. to about 1500° C. The system pressure may also be adjusted to influence the gas atmosphere.

The pyrolysis or other thermal treatment process produces a ceramic part or ceramic matrix composite which may include various ceramic materials such as, but not limited to, SiC, SiOC, $Si_3N_4$, SiON, SiCN, SiBN, SiBCN, BN, or a combination thereof. The composition of the ceramic part or ceramic matrix composite obviously is directly dependent on the composition of the starting monomer formulation. When carbon is desired in the ceramic material, the fraction of carbon may be tailored, for example, by adding phenyl groups on the side chain of the polymer or by using a carbon-based crosslinking agent such as divinyl benzene, or through the use of a carbonaceous composite overwrap.

The geometric configuration and microstructure of the preceramic polymer determine the final geometry, composition, microstructure, and yield of the ceramic material after thermal treatment. In some embodiments, final ceramic structures are lightweight, strong, and stiff—but can withstand a high-temperature oxidizing environment.

During the thermal treatment, whether an inert or reactive thermal treatment technique is employed, gases escape. Gases are formed during the conversion of preceramic polymer to the ceramic structure, by decomposition reactions of the polymer (and if present, the composite overwrap). The escaping gases or vapors may include (but are by no means limited to) $CH_4$, $H_2$, CO, $CO_2$, $H_2O$, $SO_2$, $H_2S$, etc.

The overall mass loss associated with the conversion of preceramic polymer to the ceramic structure may vary widely, such as from about 1 wt % to about 90 wt %, e.g.

about 5, 10, 20, 30, 40, 50, 60, 70, or 80 wt %. The overall mass loss will be dictated by the starting formulation (e.g., fraction organic versus inorganic) as well as by process parameters. In principle, the lost mass may be recovered separately and used for other purposes.

Associated with mass loss may be shrinkage of the preceramic polymer as it converts to the ceramic structure. The linear shrinkage (calculated in a single dimension, such as height of part) may be from 0% to about 60%, for example. Note that the mass loss and shrinkage are not necessarily correlated. In some embodiments with high mass loss, there is not much (if any) shrinkage. These embodiments tend to produce higher porosity and therefore lower densities. Other embodiments tend to produce lower porosity, or no porosity, and therefore higher densities (e.g., fully dense ceramic materials). Finally, in some embodiments, there is little mass loss but shrinkage associated with chemical reactions takes place. These embodiments also tend to produce relatively high densities.

The final ceramic structure may be characterized by at least 50% theoretical density, preferably at least 75% theoretical density, and more preferably at least 95% theoretical density. By "theoretical density" it is meant the actual density of the ceramic structure as a percentage of theoretical density of the material itself, calculated in the absence of porous voids. For example a ceramic structure with absolute density of 2.0 g/cm$^3$, fabricated from a base material with inherent (bulk) density of 2.1 g/cm$^3$, exhibits a theoretical density of 2.0/2.1=95%.

In various embodiments, the ceramic structure is characterized by a theoretical density of about (or at least about) 50%, 60%, 70%, 75%, 80%, 85%, 90%, or 95%. In certain embodiments, without limitation, the ceramic structure is a fully dense monolith, which means that the ceramic structure has at least 99% (e.g., essentially 100%) theoretical density associated with a part or continuous region of material (also referred to as a "monolith"). The absolute density in g/cm$^3$ will vary, depending on the selection of base materials; an exemplary range is about 1 g/cm$^3$ to 4 g/cm$^3$.

Despite shrinkage, if any, the bulk shape (relative geometry) of the preceramic 3D-printed polymer part may be preserved in an individual part for a larger object. That is, when shrinkage is uniform in all dimensions, the geometrical features are retained in the part: it is a scaled-down version, in all three dimensions. In some embodiments, shrinkage is approximately uniform, which means the geometrical features are basically maintained, with slight deviations. Uniform shrinkage is possible when there is no random fragmentation during conversion of the preceramic polymer to the ceramic structure, and when the reactions and gas escape are isotropic within the material. Note that very small features, such as at the nanoscale, may not be preserved during otherwise uniform shrinkage.

Practically speaking, uniform shrinkage (or no shrinkage) enables the formation of parts that are "net shape" or "near net shape." "Net shape" means that the geometrical features are retained, so that manufactured parts allow final fabrication matching the intended design with little or no post-processing. "Near net shape" means that the geometrical features are not perfectly retained but require only minimal post-processing or hand-work. Both net-shape parts and near-net-shape parts require little or no machining, polishing, bonding, surface finishing, or assembly.

In some embodiments, the final ceramic structure is a fully integrated ceramic object with no seams. A "fully integrated ceramic object with no seams" herein means a ceramic object made by uniting multiple objects, resulting in a fully dense ceramic object with no visible joint seams. A fully integrated ceramic object is typically structurally equivalent to a single part created by pyrolyzing a single preceramic polymer part with no joining of smaller parts. In certain embodiments, the joint seams may be detectable on a microscopic or nanoscopic level, physically (e.g., interfacial grain structure) or chemically (e.g., chemical composition of joint material versus bulk material). Practically speaking, if the seams are not visible without magnification and do not negatively impact the material properties of the final ceramic object, this is regarded as functionally equivalent to an absence of seams in the fully integrated ceramic object.

The strength of the final ceramic material will vary, depending on the initial preceramic resin formulation, as well as the processing parameters including potentially the joining technique. In some embodiments, the mechanical strength (e.g., tensile strength, compressive strength, shear strength, or fracture toughness) of the final ceramic material made by the present methods (joining preceramic polymers prior to ceramic formation) is the same as, or higher than, the mechanical strength of a geometrically equivalent ceramic structure made by machining a ceramic body or by joining ceramic parts. In certain embodiments, the mechanical strength is higher due to the use of a composite overwrap. In some embodiments, the final ceramic material is characterized by a Young's Modulus of at least about 200 GPa, 300 GPa, 400 GPa, 500 GPa, or more, measured at 25° C. In some embodiments, the final ceramic material is characterized by a flexural strength of at least about 300 GPa, 400 GPa, 500 GPa, or more, measured at 25° C. In some embodiments, the final ceramic material is characterized by a hardness of at least about 10 GPa, 20 GPa, 30 GPa, or more, measured at 25° C. The engineering strength of a ceramic object also will depend on the geometry of the assembled structure.

The thermal stability of the final ceramic material will vary, depending primarily on the initial preceramic resin formulation, as well as the processing parameters. In various embodiments, the final ceramic material is thermally stable at a temperature of at least 1500° C., 1600° C., 1700° C., 1800° C., 1900° C., or 2000° C. Thermal stability means at least that the ceramic material does melt at these temperatures, and preferably also that the ceramic material does not react (e.g., by oxidation or reduction), undergo thermal shock, or physically decompose (introducing defects) at these temperatures. In some embodiments, for example, the ceramic structure is characterized by being stable in the presence of air at a temperature of about 1000° C., 1100° C., 1200° C., 1300° C., 1400° C., 1500° C., 1600° C., 1700° C., 1800° C., or higher. In some embodiments, the thermal stability of the final ceramic material made by the present methods (joining preceramic polymers prior to ceramic formation) is the same as, or higher than, the thermal stability of a geometrically equivalent ceramic structure made by machining a ceramic body or by joining ceramic parts. In certain embodiments, the thermal stability is higher due to the use of a composite overwrap.

The final ceramic structure may have at least one dimension of about 1 centimeter or greater, such as about 10 centimeters, about 100 centimeters, about 1 meter, or greater.

The final ceramic structure may be subjected to coloring (e.g., with inks or dyes), stamping, or other non-functional features, if desired.

EXAMPLE

In this Example, some embodiments of this disclosure are reduced to practice, to produce a SiOC ceramic assembly in the geometry of a three-blade rotor.

A monomer mixture containing 100 parts of vinylmethoxysiloxane polymer, 100 parts of (mercaptopropyl)methylsiloxane polymer, 0.5 parts of 2,2-dimethyl-2-phenylacetophenone, 0.15 parts tert-butylhydroquinone, and 0.25 parts 2,2'-(2,5-thiophenediyl)bis(5-tert-butylbenzoxazole) (all parts by weight), is thoroughly stirred or blended to make sure the components are well-mixed and the mixture is a uniform system. The material mixture is then readily used for stereolithography. The 3D print is performed using a Formlabs 1, SLA (Formlabs, Somerville, Mass., U.S.) with laser wavelength at 405 nm for 10 seconds at approximately 25 mW/cm$^2$.

The preceramic resin formulation is 3D-printed into preceramic polymer parts (FIG. 3A). Multiple, individual polymer parts in FIG. 3A include a central member 340 and three equivalent blades 310, 320, and 330 made from polysiloxane preceramic polymer.

Siloxane monomer resin is applied to the surfaces of the parts 310, 320, 330, and 340 that will contact each other. The individual polymer parts 310, 320, 330, and 340 are joined by inserting each of blades 310, 320, and 330 into physical openings of central member 340. The joined surfaces are then chemically bonded to each other, resulting in the intermediate polymer assembly 350 in FIG. 3B.

Finally, pyrolysis is carried out to convert intermediate polymer assembly 350 into final ceramic assembly 360 in FIG. 3C. The pyrolysis conditions include an inert atmosphere at a temperature of 1000° C. for about 1 hour. The final ceramic assembly 360 is a SiOC-containing three-blade rotor.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A method of fabricating a ceramic structure, said method comprising:
   (a) selecting an overall ceramic structure geometry;
   (b) selecting a plurality of ceramic sub-structure geometries as geometric components of said overall ceramic structure geometry;
   (c) making a plurality of preceramic polymer parts that have said ceramic sub-structure geometries;
   (d) chemically, physically, and/or thermally joining said preceramic polymer parts together, to generate a preceramic polymer structure; and
   (e) thermally treating said preceramic polymer structure, to generate said ceramic structure that has said overall ceramic structure geometry selected in step (a).

2. The method of claim 1, wherein said preceramic polymer parts are made by polymerizing a polymerizable preceramic resin.

3. The method of claim 1, wherein said preceramic polymer parts include a preceramic polymer selected from the group consisting of polycarbosilane, polysilane, polysilazane, polysiloxane, polyborazine, and combinations thereof.

4. The method of claim 1, wherein said preceramic polymer parts include a particulate filler.

5. The method of claim 1, wherein step (c) employs additive manufacturing, subtractive manufacturing, casting, or a combination thereof.

6. The method of claim 5, wherein step (c) employs an additive manufacturing technique selected from the group consisting of stereolithography, binder jetting, polyjetting, extrusion printing, and combinations thereof.

7. The method of claim 1, wherein step (d) employs a curable monomer resin to bond at least some of said preceramic polymer parts together.

8. The method of claim 7, wherein said curable monomer resin is selected from the group consisting of siloxanes, carbosilanes, silanes, silazanes, silsesquioxanes, borazines, phenolics, and combinations thereof.

9. The method of claim 1, wherein during step (d), at least some of said preceramic polymer parts are held together by mechanical means.

10. The method of claim 9, wherein said mechanical means are designed into at least some of said preceramic polymer parts.

11. The method of claim 1, wherein during step (d), at least some of said preceramic polymer parts are held together with a core or mold.

12. The method of claim 11, wherein said core or mold melts out and/or vaporizes during step (e).

13. The method of claim 1, wherein step (d) employs thermal bonding of at least some of said preceramic polymer parts at a temperature of about 350° C. or less.

14. The method of claim 1, wherein said method further comprises disposing a composite overwrap onto said preceramic polymer structure.

15. The method of claim 14, wherein said composite overwrap includes a material selected from the group consisting of carbon fibers, glass fibers, silicon carbide, Si—C—O fibers, silicon nitride, alumina fibers, polymer fibers, and combinations thereof.

16. The method of claim 14, wherein said composite overwrap is infiltrated with a material selected from the group consisting of siloxanes, carbosilanes, silanes, silazanes, silsesquioxanes, borazines, phenolics, and combinations thereof.

17. The method of claim 14, wherein said composite overwrap is employed as a scaffold to contain multiple said preceramic polymer parts when joining said preceramic polymer parts together and/or to bond said composite overwrap to said preceramic polymer structure.

18. The method of claim 1, wherein said method further comprises disposing a composite overwrap onto an intermediate ceramic structure generated by thermally treating said preceramic polymer structure, followed by thermally treating said composite overwrap disposed on said intermediate ceramic structure, to generate said ceramic structure.

19. The method of claim 1, wherein said ceramic structure includes a ceramic material selected from the group consisting of silicon oxycarbide, silicon carbide, silicon nitride, silicon oxynitride, silicon carbonitride, silicon boronitride, silicon boron carbonitride, boron nitride, and combinations thereof.

20. The method of claim 1, wherein said ceramic structure is a fully integrated ceramic object with no seams.

21. The method of claim 1, wherein said ceramic structure has at least one dimension of about 1 meter or greater.

22. A process for fabricating a ceramic structure, said process comprising:
   (a) producing a plurality of preceramic polymer parts;
   (b) chemically, physically, and/or thermally joining said preceramic polymer parts together, to generate a preceramic polymer structure;
   (c) thermally treating said preceramic polymer structure, to generate said ceramic structure; and
   (d) recovering said ceramic structure.

23. The process of claim 22, wherein step (a) employs additive manufacturing, subtractive manufacturing, casting, or a combination thereof.

24. The process of claim 22, wherein said process further comprises disposing a composite overwrap onto said preceramic polymer structure.

25. The process of claim 22, wherein said ceramic structure includes a ceramic material selected from the group consisting of silicon oxycarbide, silicon carbide, silicon nitride, silicon oxynitride, silicon carbonitride, silicon boronitride, silicon boron carbonitride, boron nitride, and combinations thereof.

26. The process of claim 22, wherein said ceramic structure has at least one dimension of about 1 meter or greater, and wherein said ceramic structure is a fully integrated ceramic object with no seams.

27. A process for fabricating a ceramic structure, said process comprising:
   (a) producing a plurality of preceramic polymer parts;
   (b) thermally treating each of said plurality of preceramic polymer parts, to generate a plurality of ceramic parts;
   (c) joining said plurality of ceramic parts by disposing a preceramic composite overwrap scaffold onto said plurality of ceramic parts, to generate an intermediate structure;
   (d) thermally treating said intermediate structure, to generate said ceramic structure; and
   (e) recovering said ceramic structure.

28. The process of claim 27, wherein step (c) further includes chemically, physically, and/or thermally joining said plurality of ceramic parts together.

29. The process of claim 27, wherein said preceramic composite overwrap scaffold includes a material selected from the group consisting of carbon fibers, glass fibers, silicon carbide, Si—C—O fibers, silicon nitride, alumina fibers, polymer fibers, and combinations thereof.

30. The process of claim 27, wherein said preceramic composite overwrap scaffold is infiltrated with a material selected from the group consisting of siloxanes, carbosilanes, silanes, silazanes, silsesquioxanes, borazines, phenolics, and combinations thereof.

* * * * *